(12) United States Patent
Li

(10) Patent No.: US 6,436,727 B1
(45) Date of Patent: Aug. 20, 2002

(54) METHOD FOR PREVENTING CORROSION OF METAL LINES

(75) Inventor: Hsien-hua Li, Taipei Hsien (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 09/911,207

(22) Filed: Jul. 23, 2001

(30) Foreign Application Priority Data

Nov. 9, 2000 (TW) .................................. 089123720 A

(51) Int. Cl.⁷ .................................................. H01L 21/00
(52) U.S. Cl. ............................ 438/30; 438/22; 438/29
(58) Field of Search .......................... 438/30, 22, 29, 438/149, 151; 257/59

(56) References Cited

U.S. PATENT DOCUMENTS

| | | | | |
|---|---|---|---|---|
| 5,498,573 A | * | 3/1996 | Whetten | 438/30 |
| 5,915,172 A | * | 6/1999 | Noumi et al. | 438/151 |
| 6,064,456 A | * | 5/2000 | Taniguchi et al. | 438/30 |
| 6,252,247 B1 | * | 6/2001 | Sakata et al. | 257/59 |
| 6,319,741 B1 | * | 11/2001 | Izumi et al. | 438/30 |
| 6,333,267 B1 | * | 12/2001 | Onishi et al. | 438/30 |
| 6,335,211 B1 | * | 1/2002 | Lee | 438/22 |

* cited by examiner

Primary Examiner—Kevin M. Picardat
(74) Attorney, Agent, or Firm—Darby & Darby

(57) ABSTRACT

A method for preventing the corrosion of metal lines without increasing production costs or changing the conditions of the LCD manufacturing process. According to this method, at least one passivation layer and at least one semiconductor layer are formed on a predetermined area at the edge of the CF to prevent vapor or other corrosive material from permeating the metal lines. Therefore, the metal lines will not be broken or suffer conductivity degradation, since no corrosion occurs, thus significantly increasing the reliability of LCDs.

6 Claims, 5 Drawing Sheets

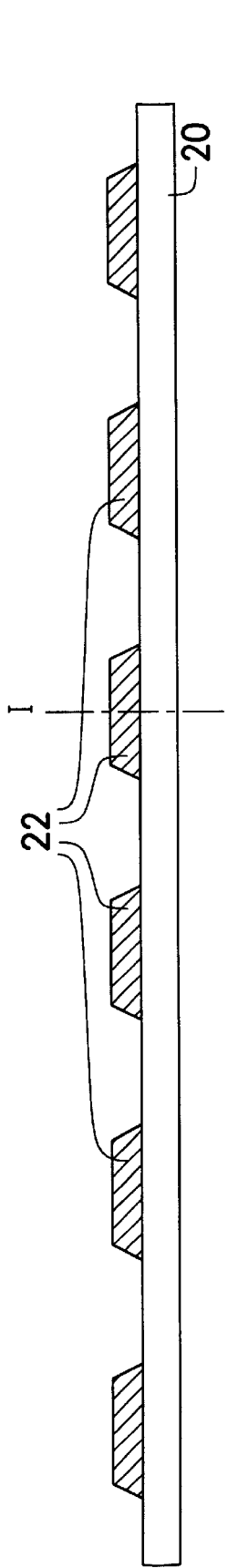
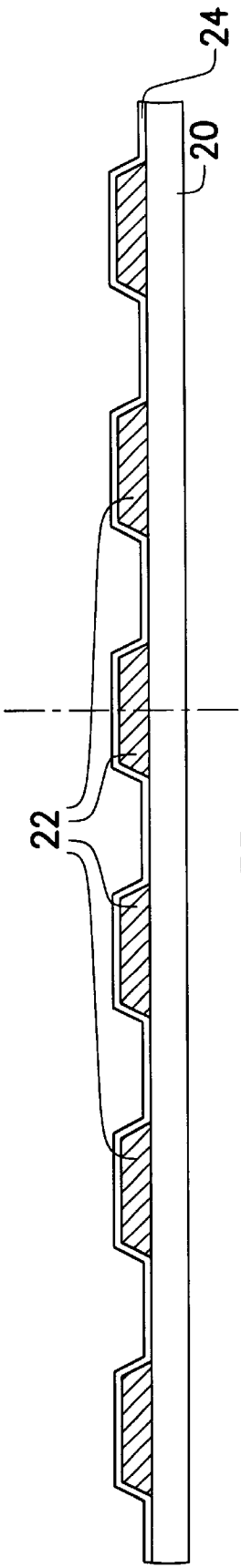
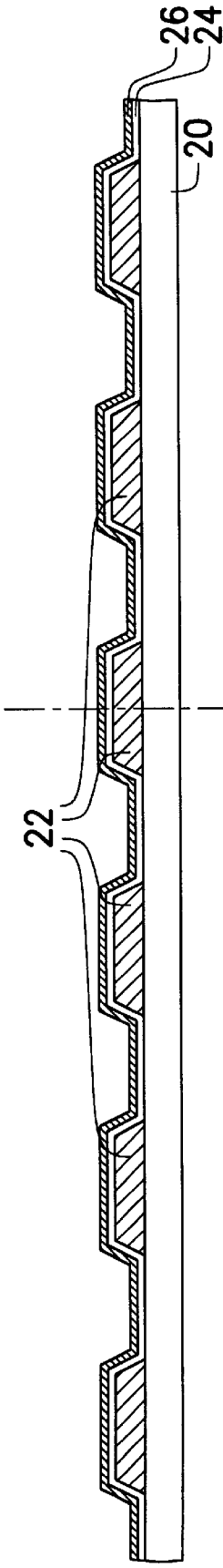

METHOD FOR PREVENTING CORROSION OF METAL LINES

BACKGROUND OF THE INVENTION

1. Field of the Invention

The present invention relates to a method for preventing the corrosion of metal lines, especially relates to a method for preventing metal lines placed at the edge of a color filter on the substrate of liquid crystal display from corroding.

2. Description of the Related Art

Liquid crystal display (hereinafter referred to as LCD) is a widely-used flat display technology. Since LCD units are light and thin with the advantages of low power consumption and low driving voltage, they are enormously popular in a variety of applications such as notebooks, digital cameras, video games, projectors, and numerous other applications. There are, however, some problems related to the fabrication of LCDs. One is that metal lines placed at the edge of the color filter (hereinafter referred to as the CF) on the LCD substrate are often corroded. FIG. 1 is a top view illustrating the corrosion 12d of metal lines 12a, 12b and 12c placed close to the edge of the CF 13 on a conventional LCD substrate. The corrosion occurring on the metal lines is caused by various conditions. First, since cracks are formed in the passivation layer by the stress generated during the CF edge cutting process, vapor and other corrosive materials may permeate through the cracks and corrode the metal lines. Second, since micro-contamination is not completely eliminated during the LCD manufacturing process. micro-contamination remaining in the deposited layers will cause cracks. FIG. 2 is a cross-sectional diagram of the metal line 12a placed at the edge of the CF on a conventional LCD substrate. In the manufacturing process of a conventional LCD, the metal line placed at the edge of the CF on the LCD substrate normally constitutes a structure as shown in FIG. 2. That is, the metal line 12a is formed on the substrate 10, and then an insulating layer 14 and a passivation layer 16 are sequentially formed on the metal line 12a. Referring to FIG. 2, once the cracks 18 are formed in the passivation layer 16, vapor, air or other corrosive material will permeate through the passivation layer 16 and the insulating layer 14 to the metal line 12a and electrolyze the metal line, causing the occurrence of corrosion on the metal line. The metal line is apt to be broken or badly connected once being corroded, thus significantly degrading the reliability of the LCD.

Prior-art methods used to overcome the above problem can be classified as follows.

First, in order to prevent metal line corrosion, macrocontamination is completely eliminated by strict control of the manufacturing process.

Second, a waterproof agent is introduced at the edge of the CF to protect the metal line from macro-contamination and vapor.

Production costs, however, increase when the manufacturing process is strictly controlled as in the first prior-art method. Similarly, production costs also increase in the second prior-art method with the addition of the step involving the introduction of the waterproof agent. Therefore, improving the reliability of LCD units without increasing the production costs or changing the conditions of the manufacturing process is a critical issue relating to the fabrication of LCDS.

SUMMARY OF THE INVENTION

Accordingly, an object of the present invention is to provide a method for protecting metal lines from corrosion without increasing production costs or changing the conditions of the manufacturing process of LCDs.

In order to achieve the above object, at least one passivation layer and at least one semiconductor layer are formed on a predetermined area at the edge of the CF to prevent vapor or other corrosive materials from permeating the metal lines. Therefore, the metal lines will not be broken or suffer conductivity degradation, since no corrosion occurs, thus significantly increasing the reliability of LCDs.

BRIEF DESCRIPTION OF THE DRAWINGS

The present invention can be more fully understood by reading the subsequent detailed description in conjunction with the examples and references made to the accompanying drawings, wherein:

FIGS. 3A to 3F are cross-sectional diagrams illustrating the method for preventing the metal lines from corrosion according to this invention.

DETAILED DESCRIPTION OF THE PREFERRED EMBODIMENT

Figure 1:
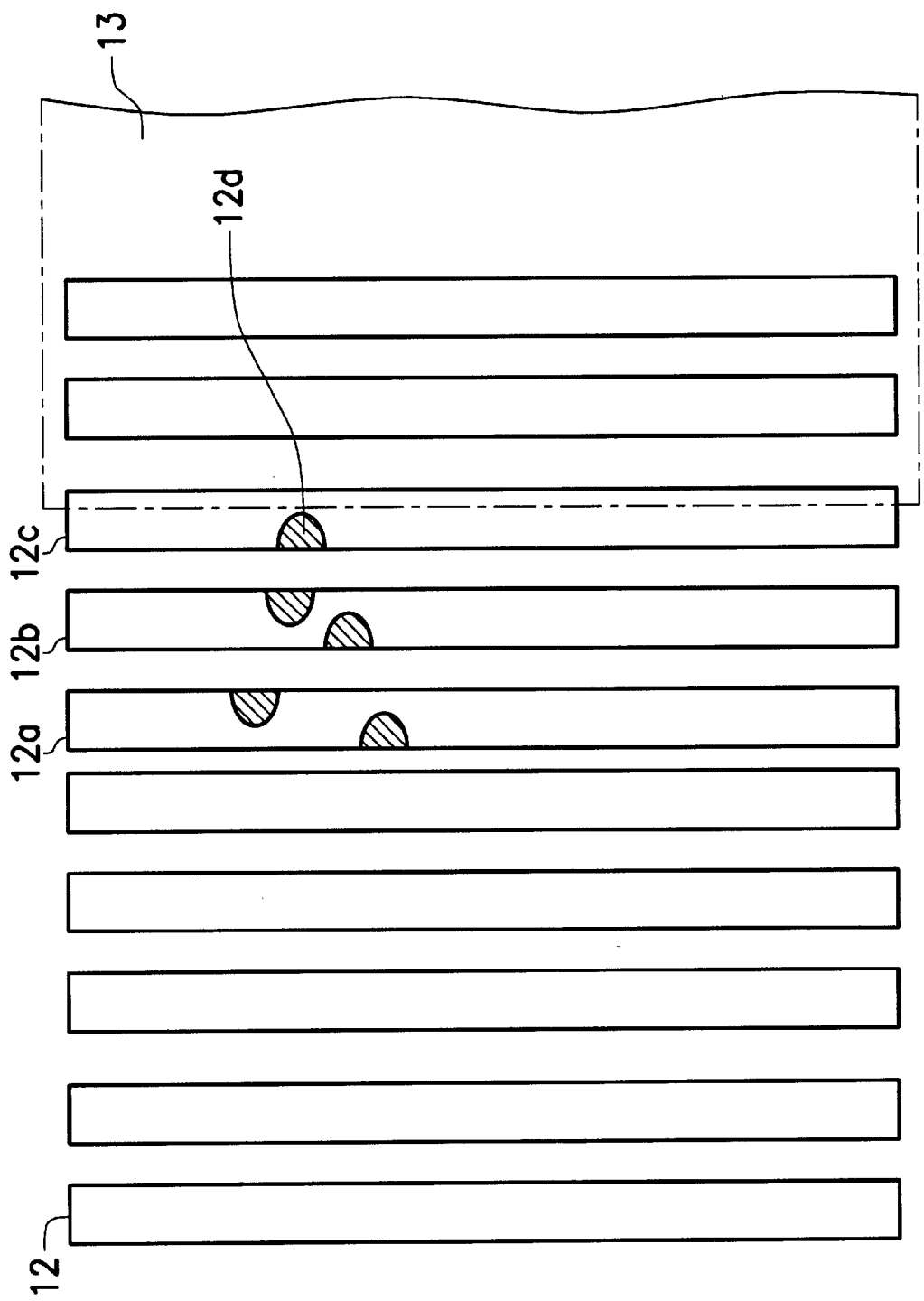
FIG. 1 is a top view illustrating the corrosion of metal lines placed close to the edge of the CF on a conventional LCD substrate.

The method for preventing the metal lines from corrosion according to one embodiment of this invention is described below.

FIGS. 3A to 3F are cross-sectional diagrams illustrating the method for preventing metal lines from corroding according to this invention. In the drawings, the dotted line I–I' represents the edge of the color filter. The area on the left of the dotted line I–I' represents the area covered by the color filter.

As shown in FIG. 3A, a first metal layer is formed on the substrate 20, and is defined as first metal lines 22.

Referring to FIG. 3B, an insulating layer 24 is formed to cover the first metal lines 22.

Referring to FIG. 3C, a first semiconductor layer 26 is formed on the insulating layer 24.

Figure 3D:
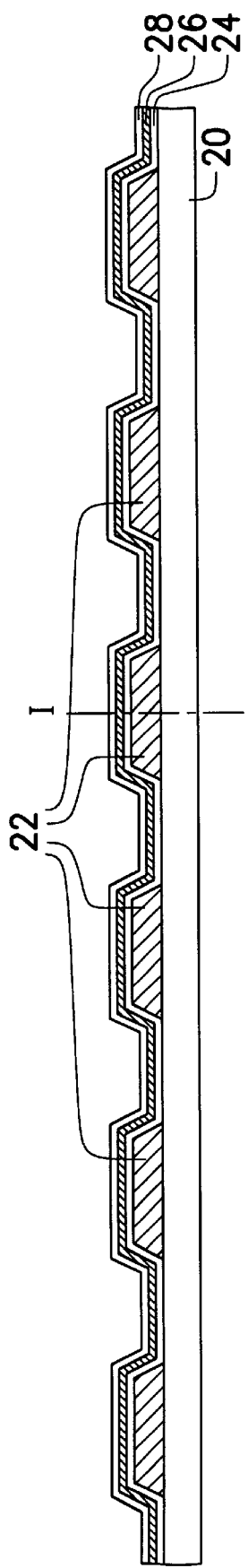

Refer to FIG. 3D, a second semiconductor layer 28 is formed 201, on the first semiconductor layer 26.

Figure 3E:
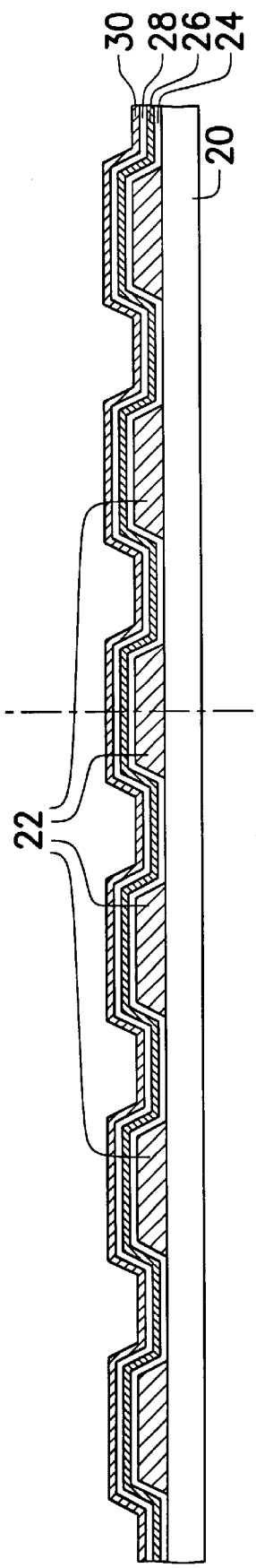

As shown in FIG. 3E, a second metal layer is formed on the second semiconductor layer 28, and is defined as a first passivation layer 30. Furthermore, by using photolithography and etching, a predetermined area on the edge of the color filter on the LCD substrate is defined, and then the first semiconductor layer 26, the second semiconductor layer 28 and the first passivation layer 30 not formed on the predetermined area are removed.

Figure 3F:
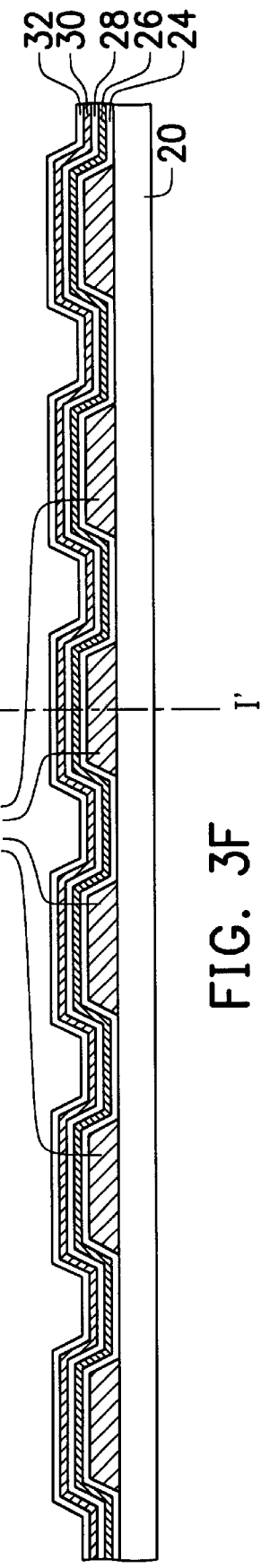

Refer to FIG. 3F, a second passivation layer 32 is formed to cover the above structure.

Figure 2:
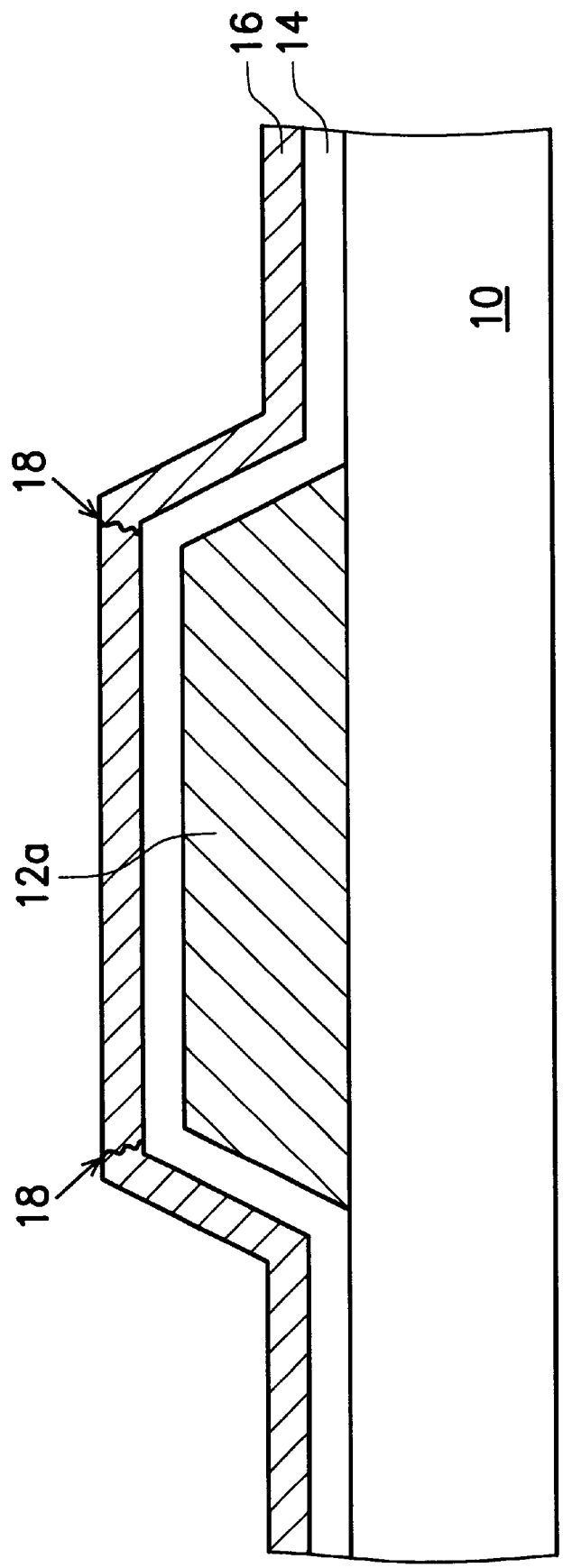
FIG. 2 is a cross-sectional diagram of the metal line placed at the edge of the CF on a conventional LCD substrate.
Figure 4:
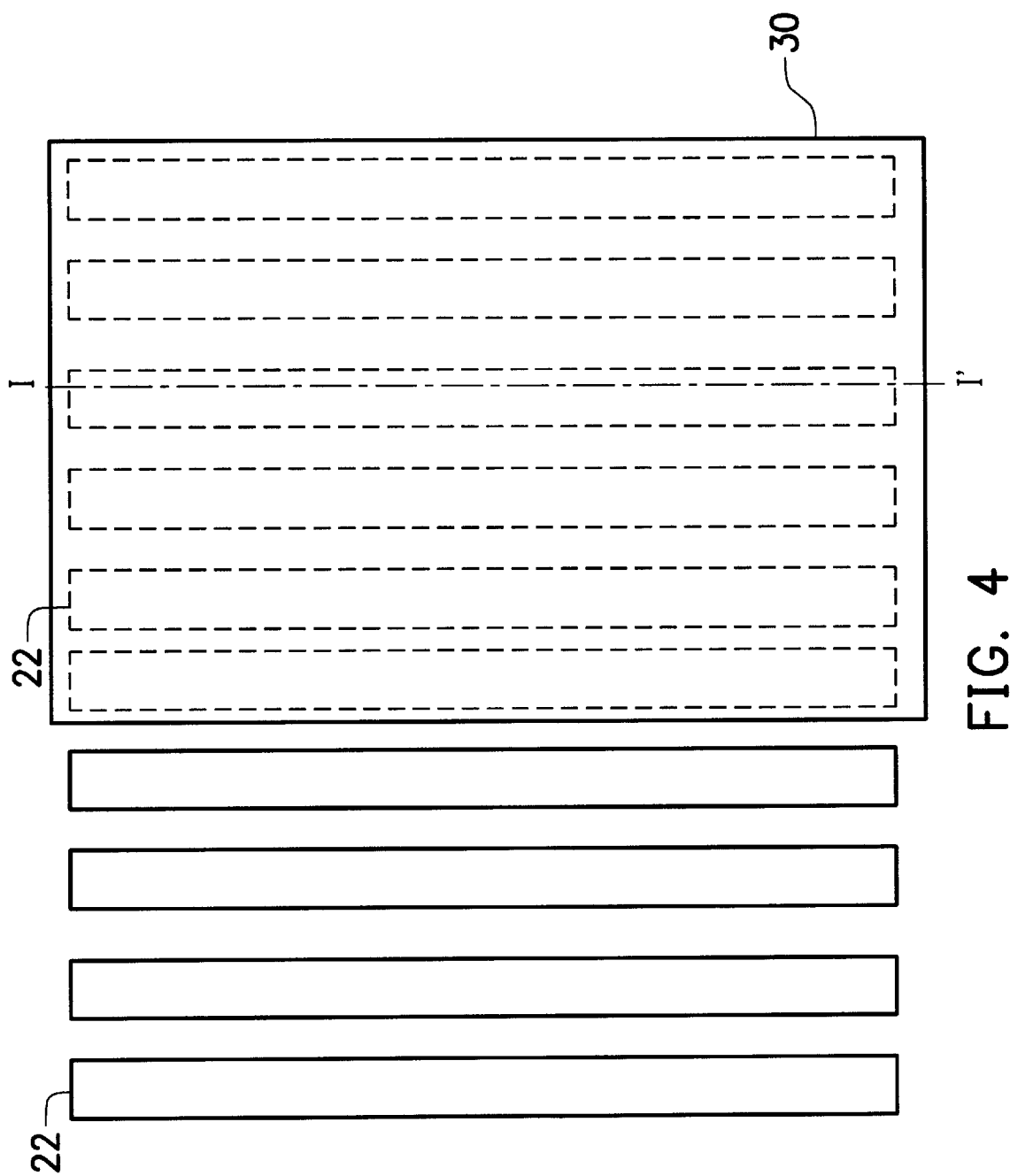
FIG. 4 is the top view of the structure of FIG. 3F.

Compared with the structure of FIG. 2, FIG. 3F and FIG. 4 show that the structure of this invention further includes a first passivation layer 30, a second semiconductor layer 28 and a first semiconductor layer 26.

The first passivation layer 30 is formed on the first metal line 22 to serve as a sacrifice layer. While vapor or other corrosive material permeates through the second passivation layer 32, the first passivation layer 30 is first corroded. Furthermore, since the potential on the whole first passivation layer 30 is equal, the corrosion due to electrolysis will not occur on the first metal line 22 until the whole first passivation layer is completely corroded. Therefore the reliability of LCDs will significantly increase since the first metal line will not be broken or suffer conductivity degradation.

Furthermore, even if the first passivation layer 30 is completely corroded, the first metal line 22 is still protected by the second semiconductor layer 28 and the first semiconductor layer 26 and thus is not corroded.

The formation of the first passivation layer 30, the second semiconductor layer 28 and the first semiconductor layer 26 on the predetermined area can be achieved by changing the photo mask design in the area of the color filter edge. The photo mask is changed to slightly increase the capacitance of the gate line. Thus, it is not necessary to add any steps or change the conditions of the manufacturing process while using the method of this invention to improve the reliability of LCDs.

Moreover, according to one embodiment of this invention, the insulating layer 24 can be made of $SiO_x$. The first semiconductor layer 26 can be made of amorphous silicon. The second semiconductor layer 28 can be made of $n^+$-doped amorphous silicon. The first passivation layer 30 covers the predetermined area at the edge of the color filter, in which the predetermined area is preferably an area extended inwardly from the edge of the color filter to include at least three metal lines as shown in FIG. 4.

Briefly, the method of this invention can prevent metal lines from corrosion without increasing production costs or changing the conditions of the manufacturing process of LCDs. The reliability of LCDs can be significantly improved since the metal lines placed close to the edge of the color filter on the LCD substrate are not broken or badly connected.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for preventing metal line corrosion, applied to the metal lines placed close to the edge of a color filter on a LCD substrate, including the steps of:

forming a first metal layer on the substrate and defining a first metal line on the first metal layer;

forming an insulating layer on the first metal line;

forming a first semiconductor layer on the insulating layer;

forming a second semiconductor layer on the first semiconductor layer;

forming a second metal layer on the second semiconductor layer and defining the second metal layer as a first passivation layer;

defining a predetermined area on the edge of the color filter on the substrate, and removing the first semiconductor layer, the second semiconductor layer and the first passivation layer not formed on the predetermined area; and forming a second passivation layer thereon.

2. The method as claimed in claim 1 wherein the predetermined area is an area extended inwardly from the edge of the color filter.

3. The method as claimed in claim 2 wherein the predetermined area is an area extended inwardly from the edge of the color filter to include at least three metal lines.

4. The method as claimed in claim 1 wherein the insulating layer is made of silicon oxide.

5. The method as claimed in claim 1 wherein the first semiconductor layer is made of amorphous silicon.

6. The method as claimed in claim 1 wherein the second semiconductor layer is made of $n^+$-doped amorphous silicon.

* * * * *